(12) United States Patent
Beukema et al.

(10) Patent No.: US 6,529,991 B1
(45) Date of Patent: Mar. 4, 2003

(54) ORDERING MECHANISM, ORDERING METHOD AND COMPUTER PROGRAM PRODUCT FOR IMPLEMENTING PCI PEER TO FUNCTIONS

(75) Inventors: Bruce Leroy Beukema, Hayfield, MN (US); Ronald Edward Fuhs, Rochester, MN (US); Kenneth Claude Hinz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,797

(22) Filed: May 12, 1999

(51) Int. Cl.[7] ................................................ G06F 13/20
(52) U.S. Cl. ........................................ 710/313; 710/310
(58) Field of Search .................................. 710/305–315

(56) References Cited

U.S. PATENT DOCUMENTS

| | | | | |
|---|---|---|---|---|
| 5,802,324 A | * | 9/1998 | Wunderlich et al. | 710/101 |
| 5,838,932 A | * | 11/1998 | Alzien | 710/128 |
| 5,870,567 A | * | 2/1999 | Hausauer et al. | 710/101 |
| 5,918,026 A | * | 6/1999 | Melo et al. | 710/128 |
| 5,983,303 A | * | 11/1999 | Sheafor et al. | 710/126 |
| 6,012,120 A | * | 1/2000 | Duncan et al. | 710/129 |
| 6,021,456 A | * | 2/2000 | Herdeg et al. | 710/260 |
| 6,073,198 A | * | 6/2000 | Meyer et al. | 710/110 |
| 6,098,134 A | * | 8/2000 | Michels et al. | 710/108 |
| 6,175,888 B1 | * | 1/2001 | Guthrie et al. | 710/129 |
| 6,175,889 B1 | * | 1/2001 | Olarig | 710/129 |
| 6,266,731 B1 | * | 7/2001 | Riley et al. | 710/129 |

* cited by examiner

*Primary Examiner*—Sumati Lefkowitz
(74) *Attorney, Agent, or Firm*—Joan Pennington

(57) ABSTRACT

An ordering mechanism, ordering method and computer program product are provided for implementing PCI local bus (PCI) peer to peer functions. When a read command is received, checking for available resource is performed. Responsive to not identifying available resource, a retry read command is sent. Responsive to sending the read command; checking for the retry read received command is provided. Responsive to identifying the retry read received command, the read command is resent.

9 Claims, 5 Drawing Sheets

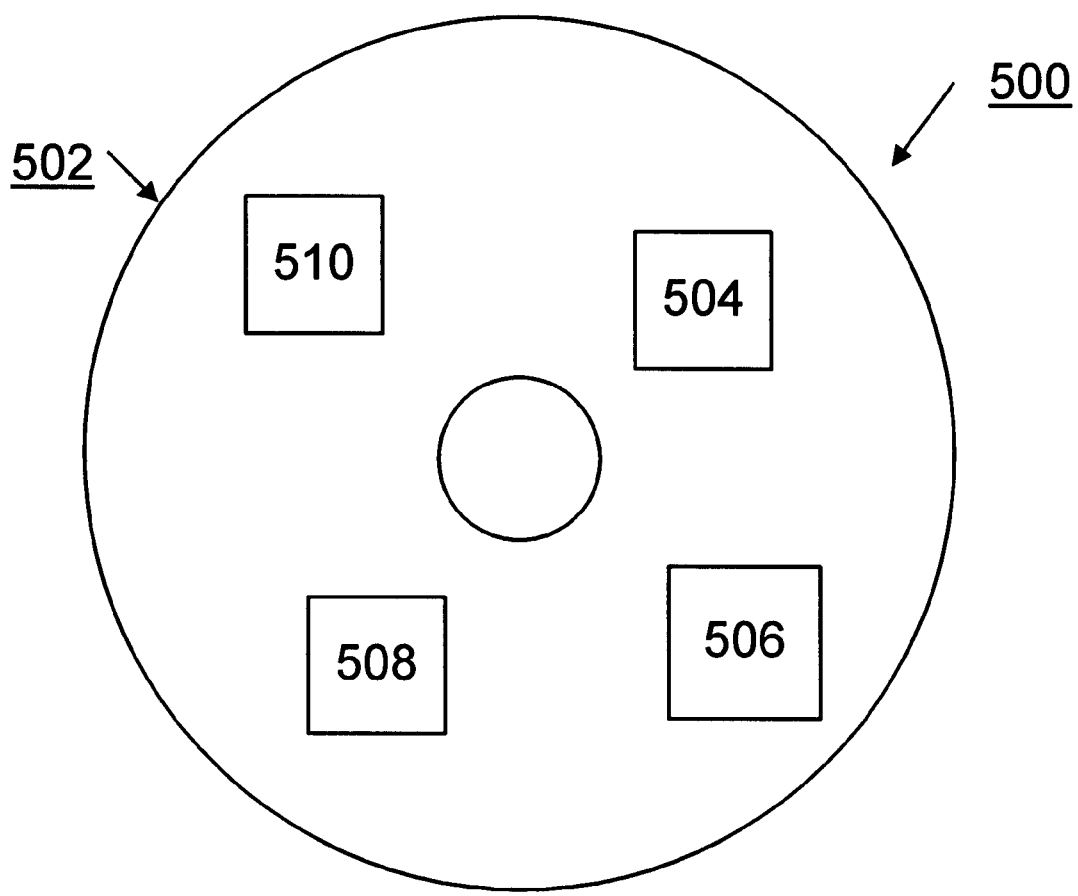

ORDERING MECHANISM, ORDERING METHOD AND COMPUTER PROGRAM PRODUCT FOR IMPLEMENTING PCI PEER TO FUNCTIONS

FIELD OF THE INVENTION

The present invention relates to the data processing field, and more particularly, to an ordering mechanism, ordering method and computer program product for implementing peripheral component interconnect local bus (PCI) peer to peer functions.

DESCRIPTION OF THE RELATED ART

PCI local bus (PCI) ordering rules require that write operations must pass read operations, but that read operations cannot pass write operations. Many interconnect networks with strongly ordered but independent command classes do not implicitly support such ordering rules. Intelligent input/output (I2O) architecture is an emerging industry standard which supports connecting intelligent IO devices, which allow peer to peer transfers.

Due to I2O/PCI ordering requirements in support of peer to peer transfers, dead lock conditions in interconnect networks have been discovered. The deadlock conditions were caused by the fact that some interconnect networks are strongly ordered for each command class, and use a busy based flow control where the destination sends a busy back to the source for a command if the destination cannot accept the command. There is no ordering requirements between command classes. Once a command is busied by the destination, the interconnect network guarantees that the busied command will be the next command in that command class, sent to the destination. In some interconnect networks more classes have been added with interdependencies between the classes. By adding additional classes and having outstanding commands in one class block the issuing of commands in another class until the first commands have been executed, the ordering restrictions can be accommodated and dead lock conditions can be prevented. This results in additional complexity and performance degradation.

An alternative protocol implements a credit based system where the source always knows how many commands the destination can receive. This allows the interrogation of a command to decide to send the command or retry the command back to the source, and solve the deadlock condition.

An improved mechanism is needed for implementing PCI local bus (PCI) peer to peer functions.

SUMMARY OF THE INVENTION

Principal objects of the present invention are to provide an ordering mechanism, ordering method and computer program product for implementing PCI local bus (PCI) peer to peer functions. Other important objects of the present invention are to provide such an ordering mechanism, ordering method and computer program product for implementing PCI local bus (PCI) peer to peer functions substantially without negative effect and that overcome many of the disadvantages of prior art arrangements.

In brief, an ordering mechanism, ordering method and computer program product for implementing PCI local bus (PCI) peer to peer functions. When a read command is received, checking for available resource is performed. Responsive to not identifying available resource, a retry read command is sent.

In accordance with features of the invention, responsive to sending the read command, checking for the retry read received command is provided. Responsive to identifying the retry read received command, the read command is resent.

BRIEF DESCRIPTION OF THE DRAWINGS

The present invention together with the above and other objects and advantages may best be understood from the following detailed description of the preferred embodiments of the invention illustrated in the drawings, wherein:

FIG. 5 is a block diagram illustrating a computer program product in accordance with the preferred embodiment.

DETAILED DESCRIPTION OF THE PREFERRED EMBODIMENTS

Figure 1:
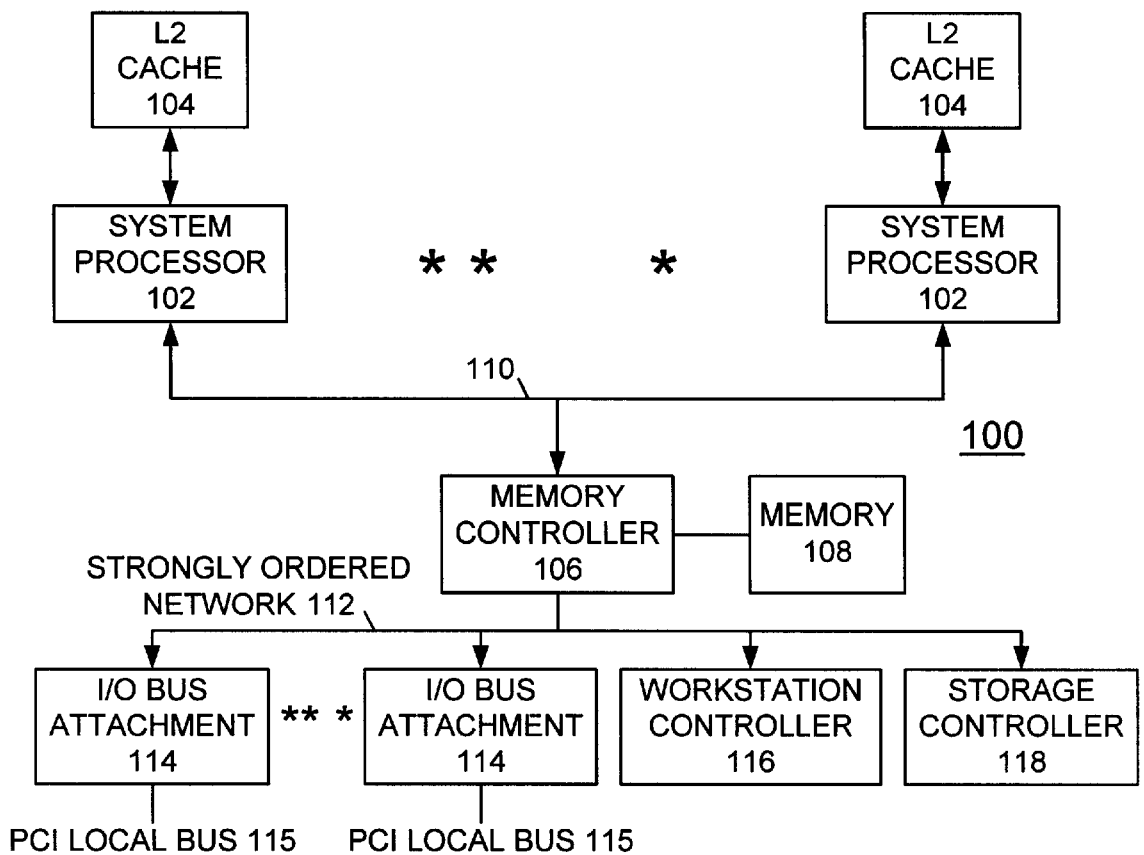
FIG. 1 is a block diagram representation illustrating a computer system for implementing a method and computer program product for implementing PCI local bus (PCI) peer to peer functions in accordance with the preferred embodiment.

Having reference now to the drawings, in FIG. 1, there is shown a computer or data processing system generally designated by the reference character 100 for carrying out the PCI peer to peer functions in accordance with the preferred embodiment. As shown in FIG. 1, computer system 100 includes a plurality of system processors 102, each with an associated L2 cache memory 104, and a memory controller 106 coupled to a main memory 108. System processors 102 are connected to the memory controller 106 via a system bus 110. A strongly ordered network 112 connects a plurality of I/O bus attachments 114 respectively coupled to a PCI local bus 115, a workstation controller 116 and a storage controller 118 to the memory controller 106 and main memory 108. It should be understood that the present invention is not limited to a particular computer model or the architecture as shown in FIG. 1. Various commercially available computers can be used for computer system 100.

In accordance with features of the invention, the PCI ordering rules are met by the provision of a resend or retry read operation of the preferred embodiment that serves as a response for a read operation. The higher level resend or retry read operation allows subsequent write operations to pass read operations, while ensuring that read operations do not pass write operations, to satisfy the PCI ordering requirements. The destination device sends a low level acknowledge packet which satisfies the strongly ordered interconnect ordering rules, and then sends the higher level retry read operation which indicates that the read operation has been discarded by the destination, and should be resent as a new operation by the source. In operation, from the interconnect protocol view point the original read operation has been executed, and the resent operation is a completely different operation. This allows later write operations to pass the read operation even if the read operation is blocked from making forward progress for an extended period of time.

Figure 2:
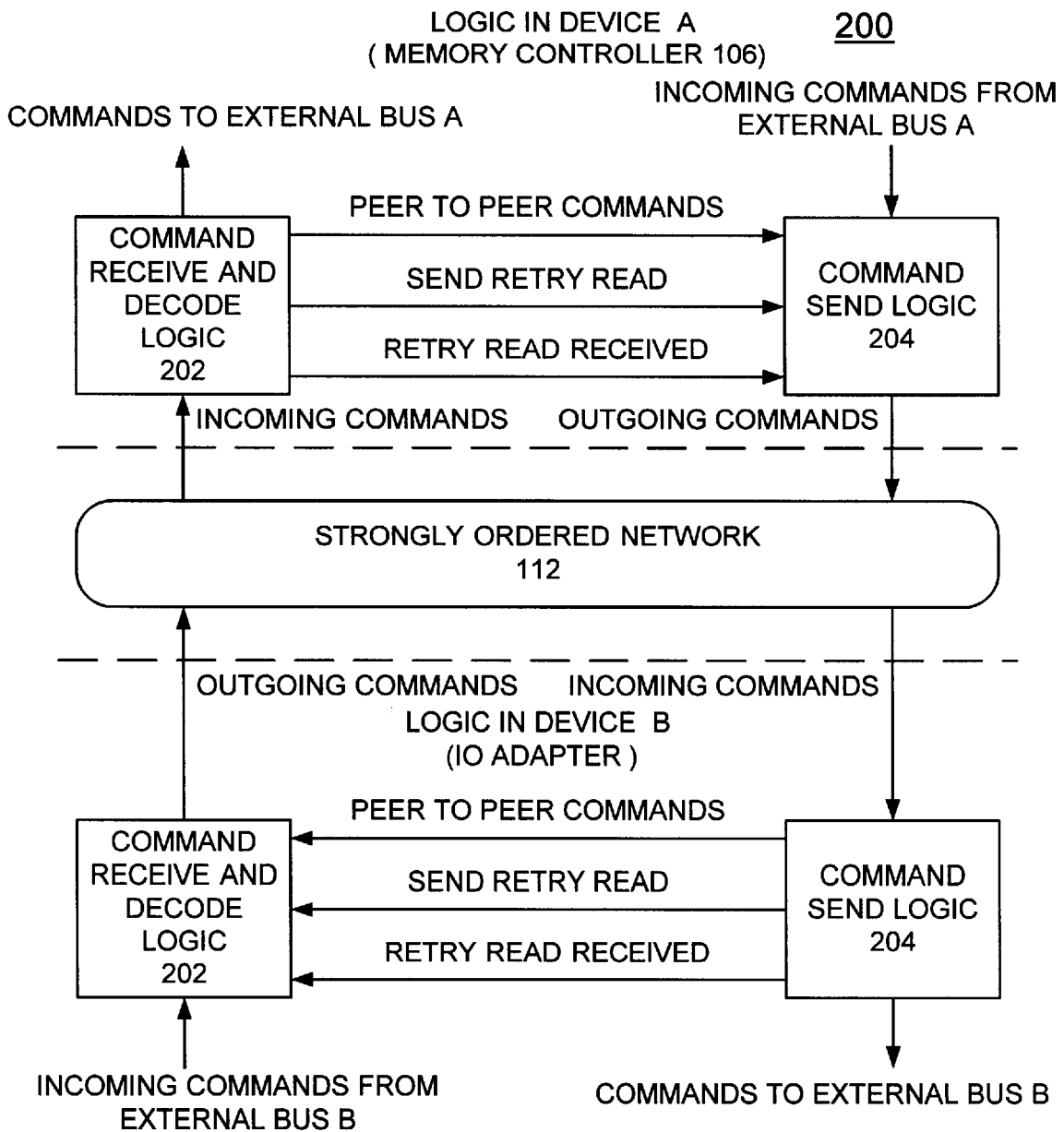
FIG. 2 is a logical flow diagram representation illustrating an ordering mechanism of the preferred embodiment in the computer system of FIG. 1 supporting the PCI peer to peer functions in accordance with the preferred embodiment.

FIG. 2 provides a logical flow diagram of an ordering mechanism 200 of the preferred embodiment in the computer system 100. As shown in FIG. 2, incoming commands from a strongly ordered network 112 are coupled to a command receive and decode logic 202 in a first device A, such as memory controller 106. Command receive and decode logic 202 applies commands to an external bus A and applies a send retry read, a retry read received and peer to peer commands to a command send logic 204 in device A. Command send logic 204 receives incoming commands from the external bus A and applies outgoing commands to the strongly ordered network 112. A second device B coupled to an external bus B similarly includes command send logic 204 and command receive and decode logic 202. Device B could be an 10 adapter or other device. It should be understood that command receive and decode logic 202 and command send logic 204 can be implemented by hardware or software and arranged in accordance with features of the invention.

Figure 3:
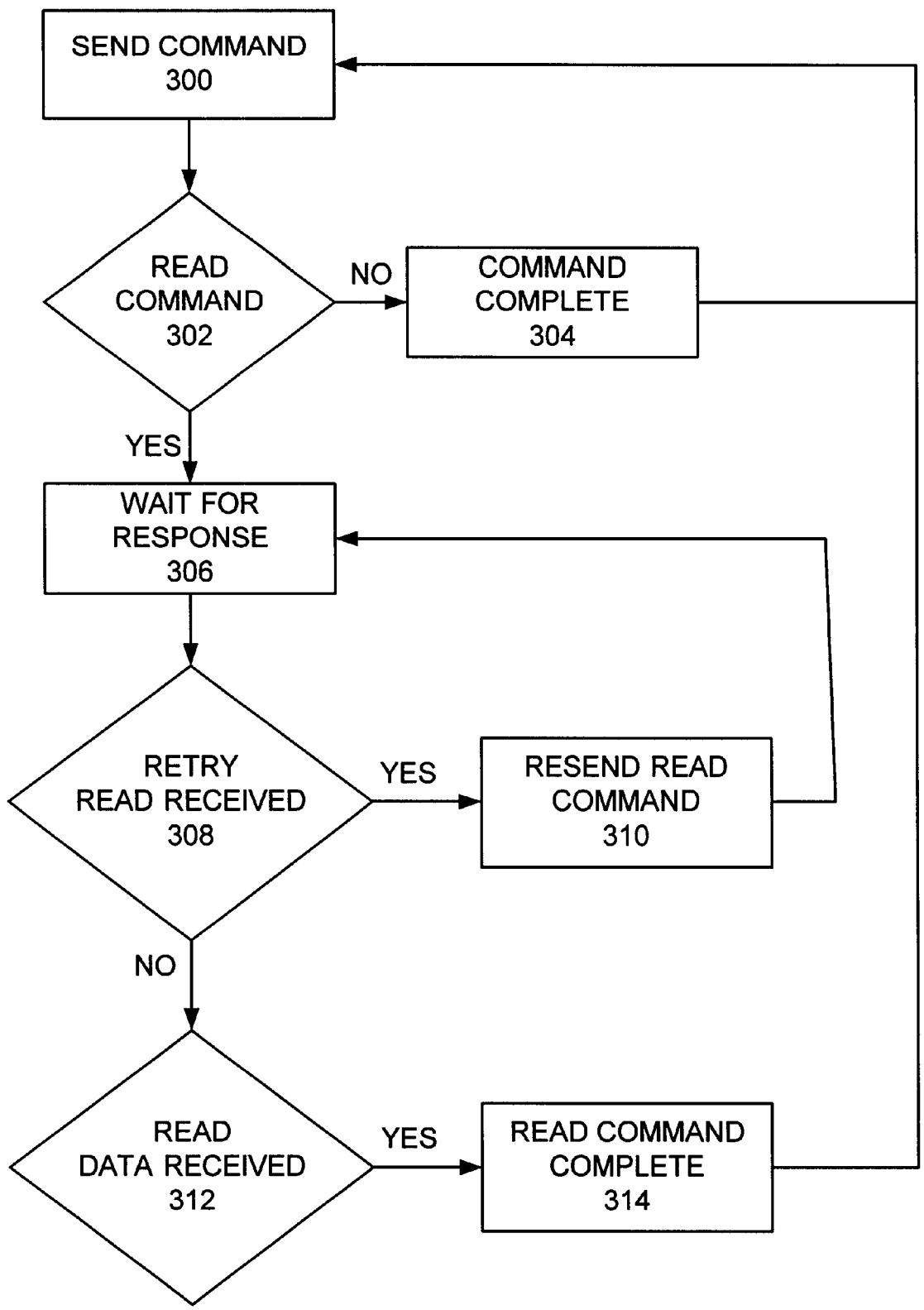
FIGS. 3 and 4 are flow charts illustrating exemplary steps for implementing PCI local bus (PCI) peer to peer functions in accordance with the preferred embodiment.

Referring now to FIG. 3, sequential steps for sending commands are shown. A send command is obtained as indicated at a block 300. Checking for a read command is performed as indicated at a decision block 302. When a read command is not identified, then the send command is completed as indicated at a block 304. Then the sequential steps return to block 300 to continue processing a next send command. When a read command is identified, then waiting for a response is provided as indicated at a block 306. Checking for a retry read received command is performed as indicated at a decision block 308. When a retry read received command is identified, then the read command is resent as indicated at a block 310. Then waiting for a response is provided as indicated at a block 306. When a retry read received is not identified, then when the read data is received as indicated at a decision block 312, then the read command is complete as indicated at a block 314. Then the sequential steps return to block 300 to continue processing a next send command.

Figure 4:
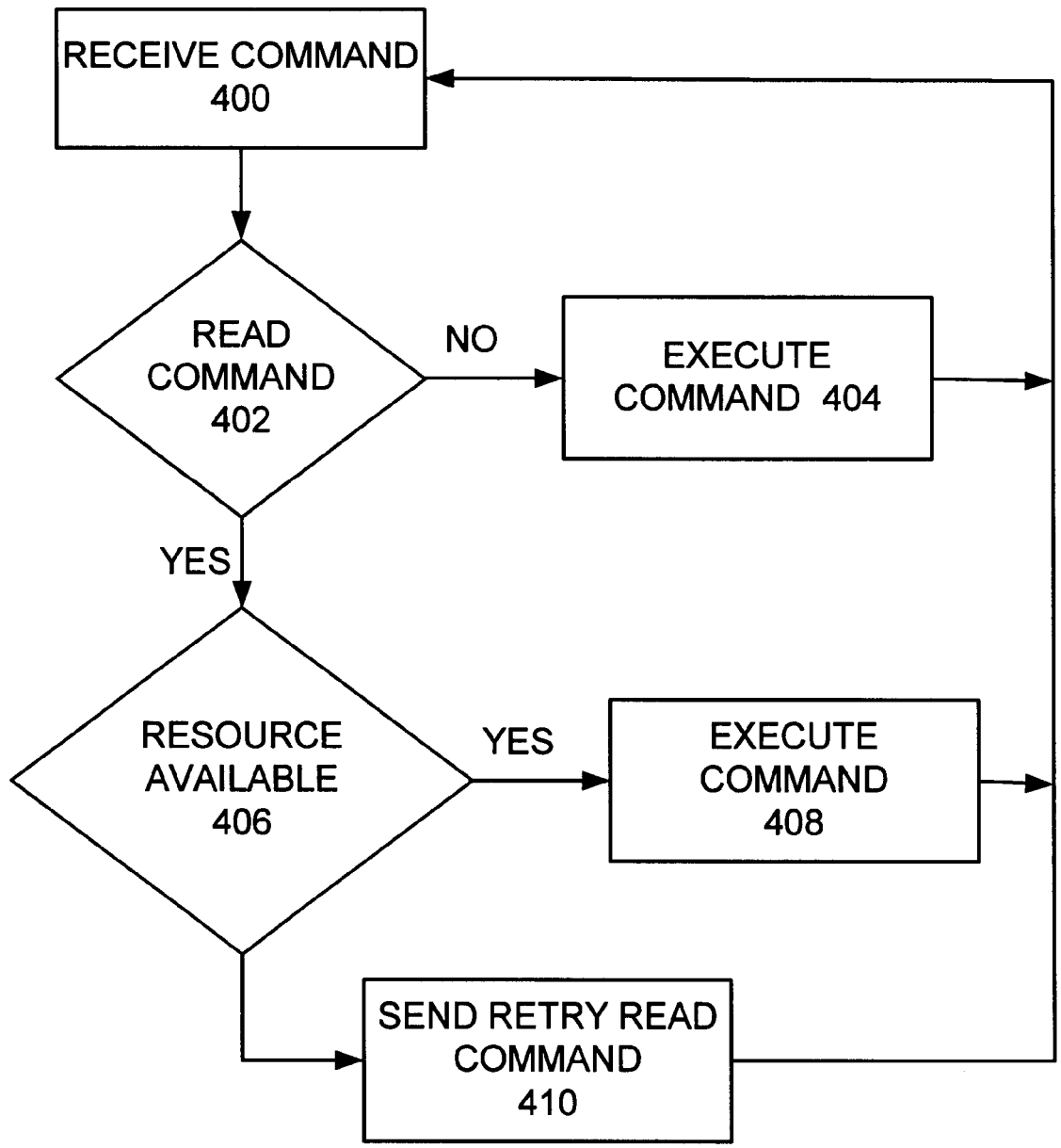

Referring now to FIG. 4, sequential steps for receiving and decoding commands are shown. A command is received as indicated at a block 400. Checking for a read command is performed as indicated at a decision block 402. When a read command is not identified, then the received command is executed as indicated at a block 404. Then the sequential steps return to block 400 to continue processing a next received command. When a read command is identified, then checking for available resource is performed as indicated at a decision block 406. When available resource is identified, then the read command is executed as indicated at a block 408. When available resource is not identified, then a retry read command is sent as indicated at a block 410. Then the sequential steps return to block 400 to continue processing a next received command.

For example, consider an exemplary operational transfer sequence between device A and device B of FIG. 2. Device A receives the following commands to execute Write A, Read A, Read B, Write B, Write C. All commands are destined to the external bus of Device B. Device A sends the commands to Device B in the order Device A receives the commands at block 300 of FIG. 3. Device B receives Write A, then Read A at block 400 of FIG. 4, but does not have resource available for Read B identified at block 406. So Device B generates the Retry Read Command at block 410 to Device A and Device B continues to receive Write B and Write C. Device B sends Write A, Read A, Write B and Write C to the external bus. Device A receives the Retry Read Command at block 308 for Read B, and resends Read B at block 310 of FIG. 3. Device B receives Read B at block 400 and has a buffer available at block 406 so Device B accepts Read B. Device B sends Read B to the external bus.

An advantage of the PCI peer to peer function processing method of the preferred embodiment is that the busy based flow control interface, with the same number of command and data queues, in general has higher performance than a credit based system. Also a credit based system needs a one to one correspondence between source and destination which makes the credit based system less scaleable than a busy based system. Also adding more classes to an interconnect network architecture adds circuits and complexity to the design. Blocking one class until another class has been executed stops the pipelining of commands and can lower performance significantly.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing PCI local bus (PCI) peer to peer functions of the preferred embodiment in the system 100 of FIG. 1.

A sequence of program instructions or a logical assembly of one or more interrelated modules defined by the recorded program means 504, 506, 508, 510, direct the computer system 100 for implementing PCI local bus (PCI) peer to peer functions of the preferred embodiment.

While the present invention has been described with reference to the details of the embodiments of the invention shown in the drawing, these details are not intended to limit the scope of the invention as claimed in the appended claims.

What is claimed is:

1. An ordering method for implementing PCI local bus (PCI) peer to peer functions comprising the steps of:
   receiving a command from a strongly ordered network to an external bus,
   checking said received command for a read command;
   responsive to not identifying said read command, executing said received command;
   responsive to identifying said received read command, checking for available resource responsive to said received read command,
   responsive to not identifying available resource, sending a retry read command to said strongly ordered network;
   sending a read command from said external bus to said strongly ordered network;
   waiting for a response and checking for a retry read received command;
   responsive to identifying said retry read received command, resending said read command; and
   waiting for a response and checking for a retry read received command.

2. The ordering method for implementing PCI local bus (PCI) peer to peer functions as recited in claim 1 includes the step responsive to identifying available resource, of executing said read command.

3. The ordering method for implementing PCI local bus (PCI) peer to peer functions as recited in claim 1 includes the steps responsive to not identifying said retry read received command, of identifying read data and completing said read command.

4. An ordering mechanism for implementing PCI local bus (PCI) peer to peer functions comprising:

command receive and decode logic;

said command receive and decode logic receiving incoming commands from a strongly ordered network and providing outgoing commands to an external bus;

command send logic coupled to said command receive and decode logic;

said command receive and decode logic receiving a command from said strongly ordered network; checking said received command for a read command; responsive to not identifying said read command, executing said received command; responsive to identifying said received read command, checking for available resource responsive to said received read command, and responsive to not identifying available resource, sending a retry read command to said strongly ordered network by said command send logic; and said command send logic receiving incoming commands from said external bus and providing outgoing commands to said strongly ordered network;

said command send logic sending a read command; waiting for a response and checking for a retry read received command; responsive to identifying said retry read received command, resending said read command; and waiting for a response and checking for a retry read received command.

5. The ordering mechanism for implementing PCI local bus (PCI) peer to peer functions as recited in claim 4 wherein said command send logic sends a command; checks for said read command; and responsive to not identifying said read command, completes said command.

6. The ordering mechanism for implementing PCI local bus (PCI) peer to peer functions as recited in claim 4 wherein said command receive and decode logic responsive to identifying available resource, executes said read command.

7. The ordering mechanism for implementing PCI local bus (PCI) peer to peer functions as recited in claim 4 wherein said command send logic responsive to not identifying said retry read received command, checks for read data received and completes the read command.

8. A computer program product for implementing PCI local bus (PCI) peer to peer functions in a computer system; said computer program product including instructions that cause devices coupled between an external bus and a strongly ordered network in the computer system to perform the steps of:

receiving incoming commands from a strongly ordered network and providing outgoing commands to an external bus including the steps of;

checking a received command from said strongly ordered network for a read command;

responsive to not identifying said read command, executing said received command;

responsive to identifying said received read command, checking for available resource;

responsive to not identifying available resource, sending a retry read command;

receiving incoming commands from said external bus and providing outgoing commands to said strongly ordered network including the steps of:

checking for a read command;

responsive to not identifying said read command, completing said incoming command from said external bus;

responsive to identifying said read command, checking for a retry read received command;

responsive to identifying said retry read received command, resending said read command; and responsive to not identifying said retry read received command, completing said read command.

9. The computer program product for implementing PCI local bus (PCI) peer to peer functions as recited in claim 8 wherein the instructions further cause devices coupled between the external bus and the strongly ordered network in the computer system to perform the step of:

responsive to identifying said available resource, executing said read command.

\* \* \* \* \*